Aug. 2, 1960
W. J. SHIMANCKAS
2,947,194
ROTOR FOR ACTUATING A CONTROL CABLE
Filed July 15, 1957
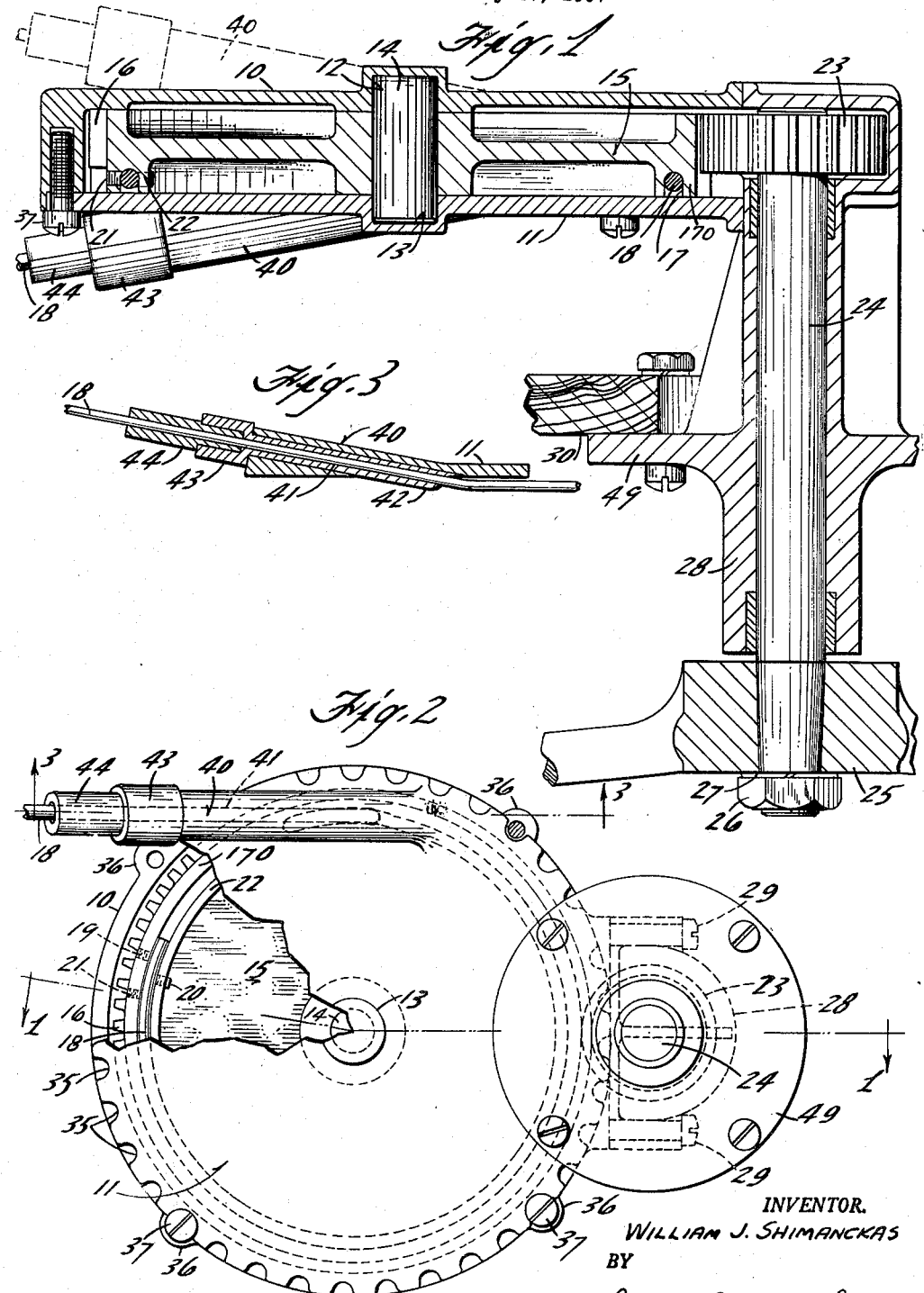
INVENTOR.
WILLIAM J. SHIMANCKAS
BY
Wheeler, Wheeler & Wheeler
ATTORNEYS

United States Patent Office 2,947,194
Patented Aug. 2, 1960

2,947,194

ROTOR FOR ACTUATING A CONTROL CABLE

William J. Shimanckas, Waukegan, Ill., assignor to Outboard Marine Corporation, Waukegan, Ill., a corporation of Delaware Filed July 15, 1957, Ser. No. 672,065

4 Claims. (Cl. 74—501)

This invention relates to a rotor for actuating a control cable.

The invention relates to a means for actuating a control cable. It differs from prior control cable actuators in that a rotor is used to actuate a push-pull type of cable to and from the face of the rotor, the surface of the rotor on which the cable is wound having shoulder means radially outside of the cable to confine the cable and drive it without friction. It is this structure which enables the rotor to be used to actuate a push-pull cable.

With prior art cable actuating rotors, some kind of fixed housing is required to retain the cable in the peripheral groove of the rotor when the rotor is discharging the cable. Otherwise the cable would merely unwind from the rotor in a slack manner without being actuated axially through its guide tube. However, the housing required to retain the cable in the groove of the rotor produces so much friction due to the radially outward force pushing the cable against the housing that such a structure is completely impractical.

In the present device, the radially outward force is absorbed by a shouldered portion of the rotor itself which is outside of the cable, and which consequently is moving with the cable, so that there is no friction.

Preferably, the cable driving shoulder is the outside wall of a groove on the face of the rotor, in which groove the cable coil is stored. The cable is fed into and lifted out of the groove by means of a tangentially directed tube which is inclined slightly respecting the plane of rotation of the rotor, and which is rigidly connected to the sheath of the control cable. Thus the use of a single run of cable is permitted by this system, whereas previous systems have required that two runs of a continuous cable be strung between the actuating drum and the actuated control.

In the drawings:

Fig. 1 is a cross sectional view of a control station embodying the invention on line 1—1 of Fig. 2.

Fig. 2 is a plan view of the control station with portions broken away to show the rotor inside the housing.

Fig. 3 is a view on line 3—3 of Fig. 2.

The invention contemplates the use of the control shown in the drawing with any conventional Bowden wire type of control cable having a cable inside of a tubular sheath, with the sheath anchored at one end to a fixed part near the control and at the other end to a fixed part near the device to be actuated. It is immaterial what the device to be actuated is, as long as it may be operated by means of a Bowden wire, but the invention is most useful when the part controlled moves a substantial distance, so that a rotor is desirable, and also where more mechanical advantage is needed than is obtainable by pushing and pulling the Bowden wire by hand.

In the drawings, Fig. 1 is a cross sectional view showing the rotor with a grooved face, cable stored in the groove, and driving connections for the rotor. Fig. 2 shows how the cable is secured to the rotor, the cable guide on the housing cover and how it is adjusted angularly, and how the shaft housing is secured to the rotor housing. Fig. 3 shows how the cable is led from the storage groove to the cable sheath.

Housing 10 is provided with a cover 11. The housing and the cover are provided with opposed aligned bearing portions 12 and 13 in which shaft 14 is journaled. Rotor 15 is rotatably mounted on shaft 14 and has spur gear teeth 16 on its periphery.

The open groove 17 on the face of rotor 15 receives actuating cable 18, the cable being anchored in the groove by means of set screws 19, 20 and 21. Set screws 19 and 21 are driven radially inwardly from the outer surface of the rotor while set screw 20 is driven radially outwardly into peripheral flange 22 between set screws 19 and 21 in order to crimp cable 18 slightly, and positively anchor it in place. The portion 170 of the rotor which forms the outside margin of the groove constitutes the shoulder which confines and drives the cable but moves with it to eliminate friction. Desirably, the cable is confined between two opposed shoulders forming a channel as shown.

The rotor is driven through spur gear 16 by means of spur gear 23 which is fixed to shaft 24, at the other end of which a hand wheel 25 is secured by nut 26 and lock washer 27 or any other appropriate fastening means. In marine practice, for example, the hand wheel 25 may comprise a conventional steering wheel. Shaft 24 is journaled in housing 28 which is secured to housing 10 by means of screws 29 or any other appropriate means. As shown, housing 28 is provided with an annular flange 49 for the purpose of mounting the control to any appropriate surface 30. As shown in Fig. 1, housing 10 may be mounted in two positions on housing 28, one of which is shown in full lines and one in dotted lines. Reversal of the housing changes the direction in which shaft 24 must be rotated to effect a given movement of the cable; that is, a counterclockwise movement of shaft 24 will pay out the cable in one position of housing 10 and retract it in the other. Another effect of reversal is to change the angle at which the cable leaves the control station. Thus the versatility of the control station is enhanced considerably, especially in conjunction with the structure described in the next paragraph.

As shown in Fig. 2, the cover 11 is provided with notches 35 at spaced intervals around its periphery. The housing 10 is provided with ears 36 at more widely spaced points around its periphery, each ear 36 being provided with a threaded bore to receive a screw 37. Since the threaded bores partially underlie the cover 11, such screw must be positioned in a notch 35 before it enters a bore. This allows cover 11 to be placed and secured in a variety of angular positions respecting housing 10 for the purpose of controlling the direction in which cable 18 leaves rotor 15.

Cover 11 is provided with a cable guide housing 40 through which runs cable guide 42, which has an enlarged end 43 counterbored to receive cable sheath 44. Cable 18 is reciprocable axially through bore 41 of member 42 and through cable sheath 44. Cable guide 42 is so positioned that cable 18 leaves rotor 15 tangentially and at a slight angle to the plane of rotation of rotor 15. The far end of cable sheath 44 is fastened in any desired or conventional manner to a fixed part and that end of cable 18 is fastened in any appropriate manner to a movable controlled part.

This invention is particularly useful in replacing control installations previously requiring that a closed loop of control cable be strung in two runs on pulleys from the control station to the device which is controlled, motion being given to the cable by wrapping the cable several times around a drum which is secured to a hand wheel. For instance, a boat may now be steered by the above described mechanism using applicant's Bowden wire type of cable having only one run rather than a system of pulleys and cables requiring two runs. Applicant's novel structure includes means for adjusting the direction of the cable as it emerges from the rotor, and means for preventing the radial thrust exerted on the cable from causing undesirable friction between the cable and the housing of the rotor.

I claim:

1. In combination, a first housing having spaced wall members, a gear rotatable in the housing and having a face in contact with one of the housing wall members and having a peripheral channel in said face, a guide duct on one of said wall members extending tangentially from said channel and at an angle to the channeled face of the gear, a Bowden cable anchored at one end in said channel and extending through the duct for axial movement therein upon rotation of the gear, a second housing in substantially fixed position, means for reversibly supporting the first housing from the second housing, a shaft extending into the second housing, and a pinion meshing with the gear in both of the positions of the first housing and mounted on the shaft for rotation thereby, reversal of the first housing and its said gear relative to the second housing changing the direction of extension of the guide tube relative to the axis of the shaft.

2. The device of claim 1 in further combination with means for securing said one wall member to the other in a number of different positions of angular adjustment whereby the guide duct on said one wall member is adjustable to a variety of angular positions with respect to the other wall member of said housing.

3. In combination, a first housing having spaced wall members, one of the wall members having spaced openings around the periphery thereof and the other of the wall members having threaded bores around the periphery thereof with which various openings are registerable upon angular relative adjustment of said members, screws extending through the openings into said bores for adjustably connecting the housing wall members, a rotor rotatable in the housing and having a peripheral channel in a face thereof in contact with one housing wall member, a guide duct on one housing wall member and extending tangentially to said channel and at an angle to the channeled face of the rotor, a Bowden cable anchored at one end in said channel and axially movable in the duct upon rotation of the rotor, the tangent upon which said duct is disposed being variable by relative adjustment of said members between the several positions in which they may be connected by said screws.

4. The device of claim 3 in which said rotor comprises a gear having means operatively mounting it in said first housing for rotation therein, a second housing, a pinion operatively mounted for rotation in the second housing, means for invertibly mounting the first housing on the second housing with the gear in mesh with the pinion in each of the inverted positions of the first housing with respect to the second housing, inversion of the first housing changing the direction of relative movement of the Bowden cable in response to a given movement of the pinion.

References Cited in the file of this patent

UNITED STATES PATENTS

| 1,650,336 | Farmer | Nov. 22, 1927 |
| 2,071,383 | Barrett et al. | Feb. 23, 1937 |
| 2,113,817 | Sneddon | Apr. 12, 1938 |
| 2,581,224 | Wallace | Jan. 1, 1952 |
| 2,890,595 | Loeffler | June 16, 1959 |

FOREIGN PATENTS

| 485,925 | Germany | Nov. 6, 1929 |
| 39,203 | France | Oct. 8, 1931 |
| 427,323 | Italy | Nov. 17, 1947 |